March 18, 1930.  R. J. NORTON  1,751,167
FRICTION MATERIAL
Filed Feb. 27, 1929
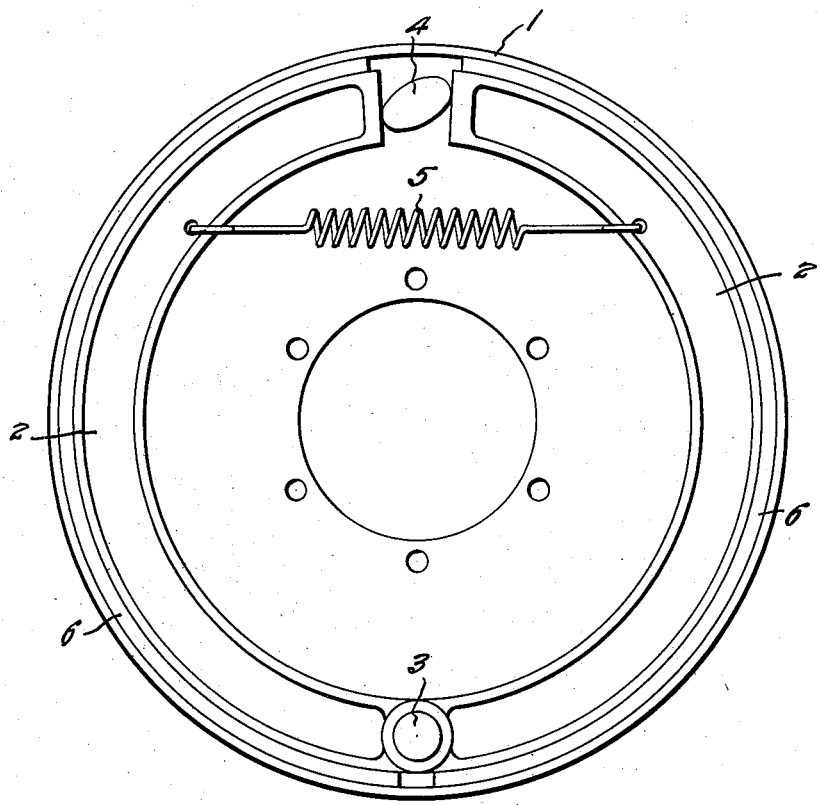
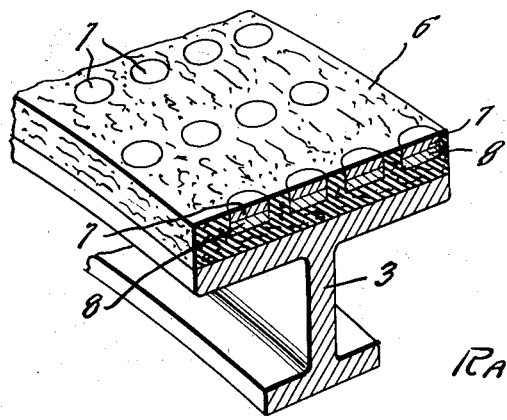
Inventor
RAYMOND J. NORTON
By
Semmes & Semmes
Attorneys Patented Mar. 18, 1930

1,751,167

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

FRICTION MATERIAL

Application filed February 27, 1929. Serial No. 343,117.

This invention relates to improvements in friction materials.

As is known, the outstanding disadvantage of most types of brakes is their relative inefficiencies in wet weather. The reason for this appears to be that the friction material absorbs a considerable amount of water, becomes wet and loses its gripping force. This disadvantage has been noted by all drivers and is recognized as a relatively dangerous condition.

In the past, attempts have been made to minimize this disadvantage by mechanically protecting the friction material against the admission of water. This has been done by providing a minimum clearance between the rotating drum and the fixed backing plate so as to preclude the admission of water in so far as possible.

The purpose of the present invention is to provide a brake band which is, so to speak, inherently self-drying. The invention is effectuated by incorporating in the friction material, and preferably at a point remote from the friction engaging surface, a substance or substances which has an affinity for water greater than that of the fibrous material of the band. In operation any water which deposits on the friction material will be absorbed by the absorbing or drying substance and will leave the remainder of the material in a relatively dry state.

It will be appreciated, from the outline of the general method by which the desired results may be accomplished, that there is a relatively wide range of materials which may be used to attain the desired results. In order to clarify the invention there is shown in the accompanying drawing a diagrammatic illustration of the structure in which the invention is embodied.

Fig. 1 represents a conventional form of brake of the internal expanding type.

Fig. 2 is an enlarged detail of the friction material which is mounted on the brake shoe.

In the drawing the usual brake structure is represented as comprising a brake drum 1 in which are mounted the cooperating shoes 2. These are pivoted at one end on the anchor pin 3 and on their opposite ends are expanded by a suitable expanding means such as a cam 4. The shoes are returned to inoperative position by a return spring 5. Each shoe 2, which may be of any desired type or form, has attached thereto a friction lining 6.

In the past, these linings have been made up of a woven or felted asbestos impregnated with a heavy asphaltic hydrocarbon which is hardened under heat and pressure. The present invention includes special treatment of the lining whereby this is made substantially self-drying by means of material which is incorporated in the facing. In accordance with the invention therefore, there is provided a, so-to-speak, anhydrous friction lining.

In one embodiment of the invention there is incorporated or embodied in the material of the lining a substance which has a decided affinity for water. For example, the lining may be impregnated with a water absorbent such as a gel, either of the granular or elastic type. If a water absorbing elastic colloid, such for instance as gelatine, agar-agar, absorbing or swelling clays such as bentonite, is employed it is preferable to provide recesses in the lining to receive this material and allow for the increase of volume of the two phase system, that is to say the water plus the colloid.

If such elastic materials are employed the friction material may be tapped to provide a plurality of recesses or hollows 7 of any desired size or shape. Preferably these extend substantially to the bottom of the friction material. When the friction band is first made up, the elastic gel 8 which is chosen may first be wetted with water and permitted to swell either to its maximum or to any predetermined extent. The plasticized absorbent may then be forced into the apertures until the latter are completely filled. Upon drying, the absorbing material will shrink or contract. Obviously it is within the scope of the invention to provide any type of interstitial or sponge-like structure within the apertures to form a mechanical retaining means for the gel. Similarly, if desired, the permanent retention of the gel in the friction material may be insured by means of an adhesive, such as a suitable gum incorporated with the gel. If desired, the adhesive and the mechanical retaining means may both be used.

It will be observed that when such a friction material is in operation, any water which finds its way to the face of the material will be taken up by the absorbent. If this material is suitably dispersed or disseminated through the friction material, and preferably at a point removed from the friction engaging surface, the water will be drawn away from the asbestos fibers near this surface and will be taken up in the absorbent.

It will be observed, at this point, that the dehydrating agent is substantially auto-revivifying. If the car is operating in wet weather, any water which enters the drum and is deposited on the friction material will be taken up by the absorbent by reason of its preferential affinity. As the brake is used the generated high heats of friction will drive off the water from the absorbing material. At the braking temperatures usually encountered under ordinary conditions this water will be dispelled in the form of vapor.

It will readily be understood that almost any desired degree of absorption or imbibition may be imparted to the elastic gel. For example, if it is desired to employ a gelatin gel its ability to absorb water may be increased by incorporating therewith accelerating electrolytes, such for example as potassium chloride, sodium chloride, ammonium chloride, sodium nitrate, sodium bromide or a substance having a thiocynate ion. Conversely the absorption and swelling may be inhibited by adding substances which contain the hydroxyl group such as alcohol or sucrose. Other suitable retarders such as sodium sulphate, sodium citrate, sodium tartrate and sodium acetate may be employed.

Since the fundamental concept of the invention is the use with a friction material of a substance which has a greater affinity for water than the fibers of the material, it will be appreciated that materials other than elastic gels may be used. For example, semi-solid or granular gels may be employed. A typical example of such non-elastic gels is the commercial product known as silica gel. This material will take up or absorb approximately one-fifth of its own weight without any increase in volume. This material therefore may be utilized for the purpose of the present invention by either depositing quantities of it in cusps or apertures formed in the brake band, or by dispersing it throughout the fibers.

This material likewise is self-revivifying. When the brake has been in use for an appreciable length of time the resultant frictional heats will drive the moisture out of the gel and restore it to its normal active state. In other words, the friction material, as prepared according to the present invention, provides for a complete cycle of water absorption and dissipation. It will be appreciated of course that silica gel is given merely as an example of the numerous other absorbing materials which may be employed. As is known, there are a number of metallic oxides which will absorb moisture in much the same manner as the silica gel.

As indicated above, the particular method of incorporating the drying agent in the friction material may be greatly varied. As shown in the drawing, it may be placed in receiving depressions or apertures in the brake band, or it may be dispersed throughout the fibers of the band at any desired stage of the manufacture.

It is to be observed that in all of the modifications employed the absorbing materials, while taking up appreciable amounts of water, nevertheless remain in substantially the solid phase and hence do not impair the tensile properties of the friction facing. Since the drying agent is autogenously regenerated its time of utility is as extensive as that of the band itself if it be properly embodied therein. If a swelling or elastic gel is employed in the open cusps, obviously any quantity which is lost by mechanical expression may readily be replaced, by first making up a mixture of the wetted material and then depositing any desired quantity of this in the depressions.

While there has been described a number of different material which may be utilized to effectuate the underlying principles of the invention, it is to be understood that these are given merely as examples of all similar materials which possess the property of preferential affinity for water as compared to the material of the brake band itself. The invention is considered to reside broadly in the concept of embodying in or associating with the friction material a substance which will absorb water and withdraw it from the contact surface of the friction material to leave the latter in a relatively drier state so as to provide in effect an autodehydratable friction material.

I claim:

1. A friction material comprising a fibrous substance in which is incorporated a drying agent.

2. A friction material comprising asbestos material in which is incorporated an elastic gel.

3. A friction material comprising asbestos material in which is incorporated a water absorbent gel.

4. A friction facing comprising asbestos in which is incorporated an elastic gel and an imbibition accelerator.

5. A friction facing comprising asbestos material with which is associated an elastic gel and an imbibition modifier.

6. A friction facing comprising a fibrous material in which is incorporated a quantity of bentonite.

7. A friction material comprising a fibrous material in which is incorporated a substance having a greater affinity for water than the fibrous material.

8. A friction facing comprising a fibrous material in which is incorporated a substance having a greater affinity for water than the fibrous material.

9. A friction facing comprising a woven asbestos tape having a plurality of depressions and a water absorbing material in the depressions.

10. A friction facing comprising a woven asbestos tape through which is dispersed a quantity of a gel.

11. A friction material comprising a woven asbestos tape through which is dispersed an elastic gel.

12. A friction facing comprising a fibrous material having a plurality of depressions therein and a water absorbing medium in the depressions.

13. A friction facing comprising a fibrous material through which is dispersed an argillaceous material which has a greater affinity for water than the fibrous material.

14. A method of increasing the efficiency of friction facing comprising associating with the facing a material which has a strong affinity for water and so dispersing the material with respect to the friction surface as to subject it to heat generated during braking.

15. A method of increasing the efficiency of friction facing comprising taking up moisture from the facing in a water absorbing material directly associated with the facing.

16. A method of increasing the efficiency of friction facings comprising embodying in the facing a material which takes up water from the facing, and driving off the absorbed moisture by applied heat.

17. A friction facing comprising a fibrous material having a water absorbing agent associated therewith and a substance incorporated with the agent adapted to modify its obsorbing property.

18. A friction facing comprising a fibrous material and a substance incorporated therein having a preferential affinity for water.

19. A friction material comprising a fibrous substance in which is incorporated an absorbing clay.

20. An auto-dehydratable friction material.

In testimony whereof I affix my signature.

RAYMOND J. NORTON.